Figure 1:
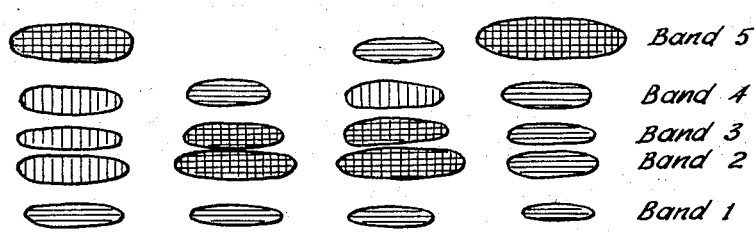
Figure 1:
Figure 1:
Figure 1:
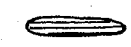

March 26, 1968    J. H. CURTIN ET AL    3,375,168
WATER-SOLUBLE PHOSPHATE COMPOSITIONS AND PROCESS FOR PREPARING
Filed Nov. 27, 1964    2 Sheets-Sheet 1

ELECTROPHORETIC PATTERN (diagrammatic)
in 5% pyridine   0.5% acetic acid, pH = 6.0

A   B   C   D

Bands of greatest intensity

Bands of medium intensity

Bands of lowest intensity

ELECTROPHORETIC PATTERN (diagrammatic) in 5% pyridine 0.5% acetic acid, pH = 6.0

Bands of greatest intensity

Bands of medium intensity

Bands of lowest intensity 3,375,168
WATER-SOLUBLE PHOSPHATE COMPOSITIONS AND PROCESS FOR PREPARING
John Hedley Curtin, North Ryde, New South Wales, and Julian Gagolski, Chatswood, New South Wales, Australia, assignors to The Colonial Sugar Refining Company, Sydney, New South Wales, Australia
Continuation-in-part of application Ser. No. 262,230, Mar. 1, 1963. This application Nov. 27, 1964, Ser. No. 414,074
13 Claims. (Cl. 167—93)

The present invention is a continuation-in-part of U.S. patent application Ser. No. 262,230, filed Mar. 1, 1963 and now abandoned.

The invention relates to a water-soluble composition of matter containing a normally water-insoluble inorganic phosphate. More particularly, it relates to a composition of matter comprising a sugar phosphate salt in complex association with a normally water-insoluble inorganic phosphate. The invention also relates to a method of preparing such a composition of matter.

It is well known that the inorganic orthophosphates of ammonium, certain low molecular weight organic cations (e.g. alkyl substituted ammonium) and certain monovalent metal cations (e.g. alkali metal) are at least reasonably soluble in water.

On the other hand, orthophosphates of the multivalent metal cations (e.g. calcium) are either relatively insoluble in water or generally suffer incongruent dissolution therein (that is, dissolution accompanied by reaction) as when monocalcium phosphate dissolves in water but then undergoes hydrolysis to form the less soluble dicalcium phosphate. (In general, it has been found that extended treatment of any calcium orthophosphate with excess water leads to the formation of an insoluble apatite.)

Solubilization determinants are recognised to be of critical importance in enabling the transport and utilization of normally insoluble phosphates in biological systems. In some plant and animal fluids, calcium phosphates are held in solution at concentrations in excess of values which would be expected at the prevailing pH; and in some cases these phosphates can be precipitated under specific conditions which are important in the formation and replenishment of calcified tissues.

The solid/liquid equilibria of multivalent metal phosphates in aqueous media are extremely complex and not well understood.

It is known that many multivalent metal phosphates (both amorphous and crystalline) can be dispersed colloidally in water to produce viscous liquids having ill-defined structure and behaviour.

It is also known that phosphates in aqueous media are capable of associating or complexing with other species (e.g. metal or organic cations); however many aspects of this phenomenon are still improperly understood.

These properties are the bases on which many commercial applications of phosphates have been made, but the poor solubility of many orthophosphates is sometimes a disadvantage.

It is an object of the invention to improve the water-solubility characteristics of normally insoluble phosphates thus rendering them suitable for use in a wide field of applications, particularly (but not exclusively) in animal and plant nutrition.

We have observed that the sugar phosphate salts of many multivalent metal and organic cations are much more soluble in water than their corresponding inorganic equivalents.

This increased solubility is probably due to the hydrophilic nature of the sugar moiety to which the phosphate groups are attached. Generally speaking, the higher the ratio of hydroxyl to phosphate on the sugar molecule the higher the water solubility of the salt. For example, the calcium salts of sucrose monophosphates are extremely soluble in water, the limit of their solubility being apparently set only by the very great increase in viscosity at high concentrations (e.g. solutions containing in excess of about 250 grams salt per 100 grams of water). The calcium salts of glucose monophosphates are also readily soluble in water, though somewhat less so than the salts of sucrose monophosphates. However, the calcium salts of hexose diphosphates, e.g. fructose 1:6 diphosphate, are considerably less soluble. We have found that the same considerations obtain for other multivalent metal salts of sugar phosphates; thus, when the multivalent metal is, e.g., copper, iron, aluminium, tin, lead or zinc, the sugar phosphate salt is always more soluble than its inorganic counterpart. For example, it is possible to dissolve as much as 160 grams of aluminium sucrose phosphate in 100 grams water at 20° C.; inorganic aluminium phosphate is insoluble in water under the same conditions.

We have also observed that sugar phosphates in aqueous media are capable of associating or complexing with multivalent metal and organic cations in a manner similar to that of inorganic phosphates.

The properties of sugar phosphates outlined above are suggestive of their high potential use in fields similar to those in which inorganic phosphates are widely used at the present time.

It is a further object of the invention to improve the usefulness of sugar phosphates in a wide field of applications similar to those in which inorganic phosphates may be used.

The composition of matter according to the invention is a synergistic combination of a sugar phosphate salt and a normally water-insoluble inorganic phosphate having properties markedly different from those of the individual components.

These compositions can be formed, inter alia, by phosphorylating a sugar in the presence of an appropriate base of a multivalent metal ion and recovering a product which contains sugar phosphate salts in complex association with the inorganic phosphate of the multivalent metal ion.

We have found that compositions can be made in this way which are soluble in water to form solutions which contain an appreciable quantity of soluble inorganic phosphate (which is normally water-insoluble) and are stable for long periods at concentrations of total dissolved phosphates exceeding about 5% by weight.

Dilution of these solutions is found to effect a slow precipitation of an insoluble phosphate associated with some sugar phosphates. The precipitated material is highly dispersed and essentially amorphous; depending on concentration factors, it may form a gel or a viscous hazy solution. Reconcentration of the solution redissolves the precipitate.

When calcium sucrose phosphates which are substantially free from inorganic calcium phosphates are intimately mixed by comminution with an inorganic calcium phosphate, the resultant product displays a solubility behavior in water which is not noticeably different from the known behaviors of the two components. The calcium sucrose phosphate component dissolves and the inorganic calcium phosphate either remains undissolved or is dissolved incongruently. (As previously explained, the more basic inorganic phosphates remain essentially undissolved; the less basic inorganic phosphates dissolve initially with ultimate precipitation of a less soluble more basic phosphate.)

The inorganic calcium phosphate component may be dissolved, of course, by acidifying this aqueous mixture. We have found, however, that provided the concentration of calcium sucrose phosphate in solution is sufficiently high, careful neutralization of this mixture will not result in precipitation of inorganic calcium phosphate. This is also true of solutions brought to pH values in excess of 7. Such a result is unexpected since, in the absence of sucrose phosphates, it is known that inorganic calcium phosphates are precipitated in neutral and alkaline solution. We have found that these neutralized solutions are stable for long periods at concentrations of calcium sucrose phosphates exceeding about 5%.

Dilution of the solution is found to effect a slow precipitation of calcium phosphate associated with some calcium sucrose phosphates. The precipitated material is highly dispersed and essentially amorphous; depending on concentration factors, it may form a gel or a viscous hazy solution. Reconcentration of the solution redissolves the precipitate.

The neutralized solution described above and that formed by the phosphorylation of an aqueous solution of sucrose and lime under appropriate conditions comprise inorganic calcium phosphate in complex association with calcium sucrose phosphates. We have already noted that such a composition cannot be produced by comminuting the two components then mixing with water; and it is also pertinent to note that it cannot be produced by some double decomposition reactions in solution.

Thus, precipitation of multivalent metal phosphate cannot be avoided (in alkaline solution), by dissolving in water a sugar phosphate salt and adding simultaneously dropwise thereto with vigorous stirring separate aqueous solutions comprising the following ingredients: (i) a soluble inorganic phosphate salt, (ii) a soluble inorganic nonphosphate salt of the multivalent metal ion.

Likewise, precipitation of multivalent metal phosphate cannot be avoided (in alkaline solution) by dissolving in water the sugar phosphate salt of a cation whose inorganic phosphate is normally soluble in water (e.g. sodium, potassium, ammonium), together with the corresponding soluble inorganic phosphate salt, and adding thereto with vigorous stirring an aqueous solution comprising the same ingredient as (ii).

It will be appreciated clearly from these examples that soluble associations of sugar phosphate salts and normally insoluble inorganic phosphates can only be prepared by certain methods; secondly, these methods are not obvious from existing knowledge of the individual properties of the components. Preferred methods of preparation of these compositions are described in detail subsequently.

Broadly, the compositions of matter which are subject of the invention exist in the solid state or in aqueous solution and can be defined as a complex association of two components (a) and (b), said component (a) consisting of one or more salts of one or more sugar phosphates, and said component (b) consisting of one or more inorganic phosphates wherein the cation or cations are selected from the group consisting of those multivalent metal cations and organic cations which would normally form essentially water-insoluble phosphates; said association being such that at least 2% by weight of component (b) based on the weight of component (a) is soluble or dissolved in water under ambient conditions when the total dissolved sugar phosphate and inorganic phosphate exceeds about 5 parts per 100 parts water by weight.

In general, no definite upper limit can be assigned to the proportion by weight of component (b) which is soluble in water under these conditions; usually the proportion of dissolved component (b) does not exceed 25% by weight based on the weight of dissolved component (a).

In the above definition of our composition of matter, we have related the solubility of the inorganic phosphate component at least to the case where the total dissolved phosphate content exceeds about 5 parts per 100 parts water by weight. It will be understood that only some of our compositions of matter are such that at least 2% by weight of component (b) based on the weight of component (a) will be soluble in water under ambient conditions when the total dissolved phosphate content of the solution does not exceed about 5 parts per 100 parts water by weight. However, all of our compositions of matter satisfy the previously defined condition.

By way of explanation of this apparent anomaly it is stressed that the nature of our composition is such that the inorganic phosphate component is more soluble in water at higher concentrations of sugar phosphates than at lower concentrations.

It has previously been indicated that inorganic phosphates normally insoluble in water can generally be dissolved by acidifying the solution. In many applications, however, acidic conditions cannot be tolerated; and it is an important advantage of our composition of matter that it is not only soluble under acid conditions, but is also soluble under neutral to alkaline conditions.

While sugar phosphates form a rapidly expanding branch of chemistry (particularly as regards their biological implications), few sugar phosphates—if any— have been produced in quantities for significant commercial utilization.

When polyhydroxy compounds such as sugars are phosphorylated, any one or a number of hydroxyl groups may be esterified. Selective esterification is only possible when special methods are involved (e.g. involving the use of enzymatic reactions or reacting substituted phosphoryl chlorides with sugar molecules carrying protected hydroxyl groups in appropriate positions). Methods of producing specific single sugar phosphates are therefore liable to remain prohibitively expensive for wide commercial applications.

We have developed methods for the manufacture of compositions falling within the scope of the invention which include the phosphorylation of a sugar in the presence of an appropriate base of a multivalent metal ion under conditions which enable the recovery of a product which consists essentially of a mixture of sugar phosphate salts of the metal ion in complex association with the inorganic metal ion phosphate.

While subsequent exemplification illustrates the use of mixtures of sucrose and glucose phosphates, it is of course understood that compositions of matter within the scope of our invention may comprise single sucrose or glucose phosphates.

Similarly, compositions of matter within the scope of the invention may comprise sugar phosphates other than sucrose or glucose phosphates (e.g. fructose, maltose, lactose). Mixtures of the phosphates of different sugars are also comprehended by the invention.

The proportions of inorganic phosphate in the product can be controlled by such factors as concentrations and rates of addition of the reactants, temperature of the reaction, degree of agitation and method of recovery of the product. For example, in the phosphorylation of sucrose in aqueous solution in the presence of lime with phorphorus oxychloride in solution in trichlorethylene, the proportion of inorganic calcium phosphate in the product can be varied by suitable control of variables.

Factors leading to an increase in the proportion of inorganic phosphate in the product are:

(1) increase of temperature of reaction between 0°– 25° C., (2) decrease in degree of agitation during the reaction, (3) increase in concentration of phosphorus oxychloride in trichlorethylene.

(4) increased rate of addition of phosphorus oxy-chloride-trichlorethylene during reaction.

In this same method of manufacture the proportion of inorganic phosphate in the product can be altered by its method of recovery from the reaction mixture. This is illustrated in the following examples of the preparation of Compositions A and D. These examples also illustrate compositions and methods for their manufacture which fall within the scope of this invention. Compositions B and C fall outside the scope of this invention.

Composition A

A solution of 280 pounds sucrose in 14 gallons water was mixed with 65 gallons of water and 150 pounds slaked lime in a reaction vessel. Additional water was added to adjust the volume to 130 gallons. The solution was cooled to 5° C. and maintained at this temperature for eight hours, during which period 120 pounds phosphorus oxychloride dissolved in 120 pounds trichlorethylene was gradually added with vigorous agitation. When reaction was complete, the mixture was centrifuged to remove suspended solids and trichlorethylene, then pumped to a glass lined vessel where 440 gallons denatured absolute alcohol were added with stirring to precipitate the product. This precipitate was separated and leached with four separate volumes of 80% ethanol before being collected in a centrifuge and dried to a fine white powder.

The product is a complex association of calcium sucrose phosphates with inorganic calcium phosphate, together with minor constituents characteristic of the reaction (e.g. traces of calcium chloride).

This composition of matter is readily soluble in water and stable viscous solutions may be prepared containing as much as 70% dissolved solids. The solutions contain about 19% by weight dissolved inorganic calcium phosphate (based on the weight of calcium sucrose phosphates present) and have pH values in excess of 7 (e.g. a 5% solution based on total dissolved phosphates has a pH value of 9.2).

If these solutions are diluted with water to below about 10 parts by weight total dissolved phosphates per 100 parts water they will begin slowly to precipitate insoluble matter consisting of calcium phosphate associated with some sucrose phosphates. The form and composition of the precipitated material, the amount of precipitation and the rate of precipitation are all dependent inter alia on the concentration of the solution. When a solution is allowed to stand for several days at concentrations of about 5 parts by weight total dissolved phosphates per 100 parts water, it is found that less than about 2% of the inorganic phosphate (based on the weight of sucrose phosphate present) remains in solution.

It will be seen later that the variation in the solubility of the inorganic phosphates and their slow precipitation on dilution are properties which are of fundamental importance in many applications of compositions according to the invention.

Analysis by conventional techniques (which have been checked for reliability) of a particular batch of the above described composition was as follows (expressed as a percentage of the dry weight of the composition):

| | Percent |
|---|---|
| Calcium | 12.5 |
| Total phosphorus | 9.3 |
| Inorganic phosphorus | 2.8 |
| Loss of weight on drying | 11.0 |
| Loss of weight on ignition | 63.0 |

An important technique which we have applied to assist in identifying compositions according to the invention is that of zone electrophoresis (paper). This may be practised with a variety of buffers, pH values, concentrations and voltage gradients. The relative mobilities of the various components are dependent on these parameters, but a typical condition which we have found useful is the following:

Buffer—5% pyridine, 0.5% glacial acetic acid in water (pH 6.0)
Paper—Whatman No. 54
Voltage gradient—16 volts/centimetre
Time for separation—2 to 2½ hours Location of the components on the paper after drying is indicated conveniently by applying an ammonium molybdate reagent which yields a blue colour in the presence of phosphate.

A typical electrophoretic pattern is shown in FIGURE 1 of the annexed drawings. This figure gives comparative results when four different products were submitted to electrophoresis in equal amounts. The composition identified as (A) was prepared by the specific phosphorylation method previously described; compositions identified as (B), (C), (D) were prepared by methods described later.

Compositions identified as (A) and (D) fall within the scope of the invention and contain more than 2% by weight of soluble inorganic phosphate based on the weight of associated sucrose phosphates; Compositions B and C fall outside the scope of the invention and contain less than this level of soluble inorganic phosphate.

Band analysis, Composition A

Composition A is seen to be distinguished by five bands. Of these, the fastest moving band (No. 5) corresponds to inorganic phosphate, and the remaining bands (Nos. 1–4) correspond to sucrose phosphates of different molecular structures.

Methods which we have employed for the characterization of these various bands have involved conventional analysis, infra-red spectrophotometry, neutron activation analysis, the determination of formula weights and the determination by X-ray diffraction of the nature of the inorganic phosphates produced when the substances are calcined at 800° C.

These methods have shown that Composition A consists of approximately 15% by dry weight of an inorganic calcium phosphate which in the solid state exists essentially as an amorphous tricalcium orthophosphate in association with approximately 80% by dry weight of a mixture of amorphous calcium salts of several sucrose phosphates. The remaining dry material consists of some calcium chloride and traces of free sucrose.

General confirmation that electrophoretic bands 1–4 consist of sucrose phosphate components is provided by elution of these bands followed by controlled hydrolysis in aqueous solution (by acids, alkalis or enzymes) to give free inorganic phosphate and the free sugars or their hydrolysis products.

The detailed characterizations which we have carried out on the sucrose phosphate components suggest that, in the particular composition A, the four bands 1–4 consist of the following types of sucrose phosphates. It will be understood, of course, that the essential properties of this composition of matter are in no way invalidated by theoretical errors in assigning these types of sucrose phosphates respectively to the various bands. We have attempted this analysis merely to illustrate the nature and complexity of sugar phosphate components which are capable of being utilised in compositions according to the invention.

Evidence indicates that band 1 derived from less than about 5% of the total dry weight of the composition consists of disucrose phosphate anions of the type,

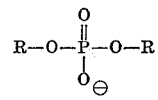

where R is the sucrose molecule minus one hydroxyl group.

Evidence indicates that band 2 derived from about 55% of the total dry weight of the composition consists of sucrose monophosphate anions of the type,

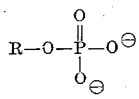

where R is the sucrose molecule minus one hydroxyl group.

Evidence indicates that band 3 derived from about 10% of the total dry weight of the composition consists of cyclic sucrose monophosphate anions of the type,

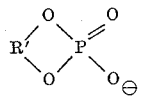

where R' is the sucrose molecule minus two hydroxyl groups.

Evidence indicates that band 4 derived from about 15% of the total dry weight of the composition consists of sucrose diphosphate anions of the type,

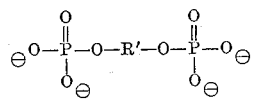

where R' is the sucrose molecule minus two hydroxyl groups.

It will be understood that these bands do not necessarily relate to single pure compounds; in some cases they may consist of isomeric sucrose phosphates. The complexity of these sucrose phosphates has prevented a complete identification of the molecular structure of each component.

Properties of the synergistic combination of phosphates according to the invention must vary to some extent with variation in the specific identity of component sugar phosphates; however, such variation falls within the scope of the defined solubility properties of the composition of matter.

*Composition B*

This composition was prepared by the method described in German Patent No. 247,809 and consists essentially of a mixture of sucrose phosphates of similar type to those ascribed to Composition A but in different proportions.

Analysis by conventional techniques of a particular batch of the composition showed that it has the following analysis (expressed as a percentage of the dry weight of the composition):

|  | Percent |
|---|---|
| Calcium | 8.1 |
| Total phosphorus | 6.8 |
| Inorganic phosphorus | 0.05 |

Composition B contains only about 0.25% by dry weight of an inorganic calcium phosphate and is readily soluble in water to give a solution which is stable at almost all concentrations. Because of this, Composition B does not display properties possessed by compositions which are subject of the invention and has little advantage over sugar phosphates per se.

*Composition C*

The composition was prepared from Composition A by the following method. A 2% aqueous solution of (A) was allowed to stand for several days to form a colloidal precipitate which was recovered by centrifugation. Ethanol was added to the resulting supernatant liquid and Composition C was precipitated.

Analysis by conventional techniques of a particular batch of the composition showed that it has the following analysis (expressed as a percentage of the dry weight of the composition):

|  | Percent |
|---|---|
| Calcium | 6.9 |
| Total phosphorus | 7.0 |
| Inorganic phosphorus | 0.2 |

As can be seen from this analysis and from FIGURE 1 (and as may be confirmed by other methods previously outlined), this material is essentially similar to Composition B but contains about 1% of an inorganic calcium phosphate. Like Composition B, Composition C is readily soluble in water to give a solution which is stable at almost all concentrations. Again, it has little advantage over sugar phosphates per se.

*Composition D*

This composition was prepared by a modification of the phosphorylation procedure described for Composition A. Instead of precipitating the reaction product after the reaction mixture has been centrifuged, a quantity of disodium hydrogen phosphate was added such that it was equivalent to the free chloride remaining in the reaction mixture. The resulting solution was then evaporated to dryness.

Analysis by conventional techniques of a particular batch of the composition showed that it has the following analysis (expressed as a percentage of the dry weight of the composition):

|  | Percent |
|---|---|
| Calcium | 10.5 |
| Total phosphorus | 8.6 |
| Inorganic phosphorus | 5.7 |

Composition D has been shown (by procedures previously outlined) to consist essentially of the following components in approximately the quoted proportions: 35% calcium sucrose phosphates, 29% tricalcium phosphate, 17% free sucrose and 19% sodium chloride.

Electrophoretic bands 1–5 for Composition D analyse similarly to electrophoretic bands 1–5 for Composition A. The faint band below band 1 for Composition D in FIGURE 1 corresponds to free sucrose.

About 57% of this composition is soluble in water at a total solids/water ratio of ⅕ by weight. The two phases have the following approximate compositions:

|  | Percent soluble | Percent insoluble |
|---|---|---|
| Calcium sucrose phosphates | 18.9 | 15.7 |
| Tricalcium phosphate | 1.5 | 27.3 |
| Free sucrose | 17.4 |  |
| Sodium chloride | 19.2 |  |
| Total | 57 | 43 |

Thus, about 8% of tricalcium phosphate based on the weight of soluble calcium sucrose phosphates is soluble in water at a concentration of about 4% by weight total soluble inorganic and sucrose phosphates.

This composition contains an appreciable quantity of soluble inorganic phosphate in complex association with a mixture of sucrose phosphates and displays the advantageous properties of the composition of matter which is the subject of the invention.

The invention is further exemplified by the following description of the preparation and properties of a composition comprising calcium glucose phosphates in association with inorganic calcium phosphate.

*Composition E*

90 grams glucose were dissolved in 1.5 litres water and 92.5 grams calcium hydroxide were added to the solution. The mixture was then cooled to 0° C. and maintained at this temperature during a gradual addition thereto with vigorous agitation of 46 millilitres phosphorus oxychloride dissolved in 75 millilitres trichlorethylene. The reaction mixture was then stirred for an hour before being centrifuged to remove any undissolved material. The resulting liquid was then concentrated to approximately 40% solids and the reaction product was precipitated by the addition of ethanol to a concentration of about 90%. The product was isolated, redissolved and reprecipitated four times under similar conditions to remove soluble impurities (e.g. calcium chloride).

The dried product is a composition within the scope of the invention and has the following elemental analysis (expressed as percentage dry weight):

| | Percent |
|---|---|
| Calcium | 10.7 |
| Total phosphorus | 11.5 |
| Inorganic phosphorus | 1.32 |

That the composition is an association of inorganic calcium phosphate with calcium glucose phosphates can be shown by, amongst other techniques, zone electrophoresis.

Figure 2:
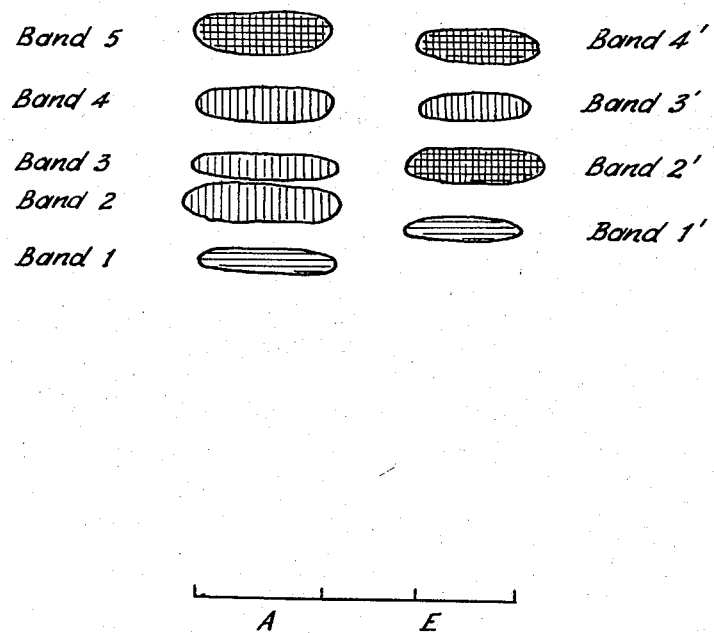
Figure 2:
Figure 2:
Figure 2:
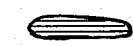

In FIGURE 2 of the annexed drawings we give a diagram comparing patterns obtained when equal amounts of Composition E and previously described Composition A were submitted to electrophoresis under conditions duplicating those already detailed. The patterns are different, but both show the same fastest moving band of inorganic phosphate, identified as band 5 for (A) and as band 4' for (E).

In the case of Composition E, by the use of the techniques mentioned earlier in connection with sucrose phosphates the remaining bands may be shown to correspond to glucose phosphate components. Evidence indicates that the major group of glucose phosphates present in the composition (and corresponding to band 2') is composed of glucose monophosphates.

It can also be shown that Composition E principally consists of a mixture of essentially amorphous calcium salts of the described glucose phosphates (about 90% by dry weight of the composition) in complex association with an inorganic calcium phosphate which exists in the solid state as an essentially amorphous tricalcium phosphate (about 7% by dry weight of the composition).

Composition E will dissolve completely in water provided the resulting solution is sufficiently concentrated (e.g. 50% by weight total solids). The solution has a pH of about 7 and contains about 8% inorganic calcium phosphate component based on the weight of calcium glucose phosphates present. When the solution is diluted to about 1 part by weight total dissolved phosphates per 100 parts water, it rapidly becomes cloudy due to the precipitation of finely dispersed insoluble material.

The above described compositions have all related to the case where the cation of the inorganic phosphate component is calcium. We have already indicated general methods for the preparation of compositions where the cation of the inorganic phosphate can be any appropriate multivalent metal. The cation in a composition may be replaced by another multivalent metal cation to give compositions which fall within the scope of the invention.

The replacement may be effected by several methods, of which three are described hereunder. The appropriate method must be chosen bearing in mind the properties of the respective compositions. It will be appreciated that these methods are merely illustrative and are in no way meant to be limiting.

Note: in the description of these methods, "required multivalent metal" refers to the metal which is required to replace the metal in a composition to give another composition falling within the scope of the invention.

METHOD 1

A solution of a composition of matter according to the invention is passed through a column charged with a cation exchange resin in the acid form. This treatment removes the bulk of the metal ions from the composition without significantly altering the proportions of inorganic and sucrose phosphates in the effluent solution from the column. This solution is then reacted with a slight excess of the freshly precipitated hydroxide of the required multivalent metal. The excess hydroxide is filtered off and the filtrate is evaporated to dryness to yield the composition.

METHOD 2

A cation exchange resin in the acid form is converted to the required multivalent metal form by passing through it a 10% solution of a soluble salt of this metal. After washing the resin free of unwanted anions, a solution of a composition of matter according to the invention is passed through the column thus effecting an exchange of metal ions. The effluent solution from the column can be evaporated to dryness or the composition can be recovered by alcohol precipitation.

METHOD 3

To a 10% solution of the composition of matter is added a 5% solution of a soluble salt whose cation consists of the required multivalent metal and whose anion is capable of forming an insoluble salt with the metal in the original composition. The precipitate which is formed is filtered off and the filtrate is evaporated to dryness to yield the required multivalent metal-containing composition. For example, to make a composition containing soluble stannous phosphate, a solution of stannous fluoride is added to a solution of a calcium-containing composition of matter and insoluble calcium fluoride is precipitated. This is filtered off and the filtrate is evaporated to dryness to yield the desired composition.

From these examples it will be obvious to those skilled in the art that various compositions can be made from other compositions within the scope of the invention by exchanging the component multivalent metal ions of organic cations for other such ions. Examples of some of the compositions which we have prepared include those containing copper ($Cu^{2+}$), manganese ($Mn^{2+}$), zinc ($Zn^{2+}$), aluminum ($Al^{3+}$), nickel ($Ni^{2+}$) and iron ($Fe^{3+}$ and $Fe^{2+}$). All these compositions display the characteristic properties of compositions which are the subject of this invention.

Composition F

This composition contains soluble cupric phosphate and was prepared by Method 2 from Composition A. The composition has the following elemental analysis (expressed as percentage dry weight):

| | Percent |
|---|---|
| Copper ($Cu^{2+}$) | 16.0 |
| Total phosphorus | 7.9 |
| Inorganic phosphorus | 2.2 |

This composition consists essentially of about 14% (dry basis) of cupric phosphate in association with about 80% of cupric sucrose phosphates. It is soluble in water to form a clear green solution of pH 8, the dissolution being greatly accelerated by heating. On dilution to form a solution of about 1% total soluble solids, the solution becomes hazy due to the precipitation of a highly dispersed insoluble material which consists of inorganic cupric phosphate associated with cupric sucrose phosphates.

Associations in aqueous solution involving ionized species can range from relatively simple complex formation to the more complicated ionic interactions occurring in complex coacervation and complex flocculation. These latter interaction phenomena depend to a very large extent on factors such as pH, concentrations of the interacting species (both absolute and relative), ionic strength and specificity of interaction.

The physico-chemical basis of the solubility behaviour of the compositions which are the subject of the invention obviously involves complex interaction of ionized species. However, the precise mechanism of these interactions—not only in these systems, but also in most others—is as yet only poorly understood.

Our studies of sugar phosphates have shown that these substances can complex with multivalent metal ions and can be adsorbed at solid/aqueous interfaces, particularly on solid inorganic phosphates. We have found that the adsorption of sugar phosphates on solid inorganic phosphates can result in the marked dispersion of these solids, (suggesting a use for sugar phosphates as deflocculating agents in various applications). We have also observed that sugar phosphates are capable of interacting with large organic cations under appropriate conditions of pH and concentration to form insoluble interaction products.

Inorganic phosphates can also behave in similar ways. Thus, when inorganic and sugar phosphates are brought into association in aqueous solution, complex interaction phenomena may occur influencing solubility characteristics in the way we have already described for compositions according to the invention. Moreover, as a result of these interactions, the properties of these soluble compositions of sugar phosphates and inorganic phosphates are in many cases different from those of the individual components. We have already indicated that these compositions can only be prepared by specially selected methods, and we believe that this is due to the complexity of the interactions involved and to differences in the kinetics of the forward and reverse reactions for the various equilibria.

The association between sugar phosphates and inorganic phosphates which exists in compositions which are the subject of the invention confers on these products advantages in many applications, not only relative to the applications of inorganic phosphates but also relative to the applications of sugar phosphates. This is illustrated by the following examples.

It is widely agreed that the dissolution of hydroxyapatite, a calcium phosphate comprising the major part of tooth enamel, is probably an early step in the formation of carious lesions in teeth. In attempts to reduce the incidence of dental caries in man consideration has been given to the retardation of the demineralization of tooth enamel by the addition of phosphates to foodstuffs. Consideration has also been given to the problem of rehardening teeth whose enamel has been softened by demineralization. In both of these lines of attack on dental caries, calcium phosphates are suggested by basic chemical knowledge to be the phosphates most likely in a natural way to retard demineralization of tooth enamel or to restore, at least partially, mineral lost therefrom. However, as pointed out previously, the calcium phosphates are either poorly soluble in water at physiological pH values or they form insoluble phosphates under these conditions.

The compositions which are the subject of the invention, however, provide calcium phosphates in a soluble form—not only as calcium sugar phosphates but as soluble inorganic phosphates in complex association with these sugar phosphates. We have shown that these compositions are effective in inhibiting the demineralizing of tooth enamel in vitro and the formation of carious lesions both in animals and in man. Examples are given hereunder.

When a human tooth whose enamel has been previously softened in a buffered acid solution is introduced into a diluted solution of the following toothpaste incorporating Composition A, the enamel will be rehardened—as can be gauged by the conventional Knoop technique for measuring hardness.

| Toothpaste components: | Parts by weight |
| --- | --- |
| Dibasic calcium phosphate | 40 |
| Glycerol | 16 |
| Sorbitol syrup | 10 |
| Gum tragacanth | 1.0 |
| Saccharin (soluble) | 0.1 |
| Sodium lauryl sulphate | 1.0 |
| Flavour | 0.5 |
| Methyl parahydroxybenzoate | 0.1 |
| Toothpaste components:—Cont. | Parts by weight |
| Sodium fluoride | 0.1 |
| Composition A | 5.0 |
| Water to make total of 100 parts by weight. | |

This toothpaste is prepared by conventional methods. The component Composition A corresponds to that previously described in this specification, i.e. it consists of particular calcium sucrose phosphates in complex association with inorganic calcium phosphate.

This same toothpaste has been tested against a control toothpaste not incorporating Composition A in an extensive trial with school children. The proportion of decayed, missing or filled tooth surfaces for children using the toothpaste containing Compoistion A was found to be less than the proportion for children using the control toothpaste. These differences between the test and control groups were significant at the 0.1% level.

We have also demonstrated that the addition of compositions based on calcium sucrose phosphates/inorganic phosphate associations to the diet of caries-susceptible rats reduces the incidence of caries in these animals compared with controls fed with equivalent amounts of inorganic phosphates. From the recognised applicability to man of results on the inhibition of dental caries in animals, and from the proved efficacy of these compositions in toothpastes on man, it is reasonable to conclude that the addition of these compositions to foodstuffs will also reduce the incidence of dental caries in man.

The compositions of this invention have a wide range of utility in the fields of animal and plant nutrition. Dissolved in aqueous solutions they provide phosphate and essential metal ions in a form very similar to that in which these species are present in the fluids of biological systems.

It is well known in both animal and plant nutrition that although nutrients may contain reasonable levels of phosphates and essential metal ions these are not always readily available for utilization by the growing organism. The form in which these nutrients exist has an important bearing on their availability. For example, in milk we have a good illustration of a readily assimilable source of calcium and phosphates which are essential to rapidly growing young animals. The association of calcium and phosphates in milk is extremely complex and the solubility behaviour of calcium phosphates in milk is typical of the complexity which occurs in many biological fluids.

Again, the occurrence of phosphates particularly in the fruit and seeds of plants is complex. Inorganic phosphates are generally associated in these tissues with organic phosphates, both of which are in a form which is readily available to the germinating plant.

It is obvious that insoluble inorganic calcium phosphates will not be as readily available to growing organisms as those which are soluble or highly dispersed as they are in biological fluids. While alkali metal or ammonium salts of inorganic phosphates are reasonably soluble in water, they must often be used in animal and plant nutrition in conjunction with multivalent metal ions with which they tend to form insoluble salts. The advantages of compositions according to the invention derive from the fact that they can provide phosphates in the presence of multivalent metal ions—both of which are soluble. Moreover, when the phosphates contained in these compositions are precipitated under certain conditions, they do so in a highly dispersed state which is advantageous in these and other applications.

The utility of these compositions as improved sources of calcium and phosphate in growing organisms is illustrated by the following example.

Batches of soybeans previously conditioned to 13% moisture and stored in cans at room temperature for 6 months were dipped for 10 minutes respectively in:

(i) 0.5% solution of Composition A, being the composition previously described under that designation;

(ii) 0.5% solution of monopotassium phosphate;

(iii) 0.5% solution of sucrose;
(iv) 0.5% solution of sucrose plus lime, containing calcium in amount equivalent to that for (i).

With solution (i), seed viability was markedly increased, being improved by an average of about 30% compared with a control batch. With solution (ii), there was a lesser effect, and with solutions (iii) and (iv) there was no demonstrated increase in viability.

As well as increasing viability it was found that the treatment with solution (i) also resulted in a marked increase in radicle growth. Compared with a control batch, the improvement in this respect for the solution (i) batch amounted to 50% (based on dried radicle weight). The improvement for the solution (ii) batch was slight (10% compared with the control); and there was no significant increase in radicle growth for solutions (iii) and (iv).

It is evident from the foregoing that it is possible to utilize with advantage the compositions which are subject of the invention to provide for plants and animals soluble readily-assimilable phosphates, essential metals and trace metals (e.g. calcium, magnesium, copper, iron, zinc).

Applications in biological fields have been discussed with particular reference to compositions comprising an association of sucrose phosphates with inorganic phosphate; it will be understood however that biologically useful compositions within the scope of the invention also comprise other sugar phosphates (e.g. glucose phosphates) in association with inorganic phosphate.

A further application of the compositions of the invention depends on the improved interaction of these compositions in aqueous solution with organic cations.

It is known that both inorganic phosphates and organic phosphates can form, under certain conditions, insoluble interaction products with large organic cations. These phenomena have led to the use of phosphates as precipitants for water soluble proteins under conditions where the proteins are positively charged, and there have been many applications in food manufacture (e.g. cheese making).

We have found that the use of compositions of the invention can have advantages over the use of inorganic phosphates or sugar phosphates in their interaction with organic cations. This can be illustrated by a description of the interaction of phosphates with cetyl trimethyl ammonium bromide (CTAB).

When a 20% solution of trisodium phosphate or disodium phosphate is added to a 7% solution of CTAB in water, no precipitation is observed. Dilution of the mixture with water to about 1% solids fails to induce precipitation; likewise, acidification with phosphoric acid fails to induce precipitation. The addition of calcum ions produces a gel, probably due to the formation of calcium phosphate.

When a 40% solution of calcium sucrose phosphates essentially free from inorganic phosphates (e.g. the substance referred to in this specification as Composition C; see FIGURE 1) is added to a 7% solution of CTAB in water, no precipitation occurs. However, dilution of the mixture with water to about 1% solids produced some turbidity and limited floc formation.

When a 40% solution of a composition consisting of calcium sucrose phosphates in complex association with inorganic calcium phosphate (e.g. the substance referred to in this specification as Composition A; see FIGURE 1) is added to a 7% solution of CTAB in water, a slight turbidity occurs. Dilution with water to about 1% solids in this case produces a copious disperse phase which is relatively stable. This solid phase may be shown to consist essentially of an association of inorganic calcium phosphate and cetyl trimethyl ammonium sucrose phosphates.

These observations illustrate the way in which the association of an inorganic phosphate with sucrose phosphates is advantageous in the formation of a disperse solid phase from an organic cation. This can be of value in such applications as protein precipitation or in the formation (in dilute solution) of a water insoluble dispersion of an organic cation. For example, various pesticides, herbicides or fungicides consist of organic molecules which can exist in solution as cations. The persistence of these agricultural chemicals is sometimes limited because of their water-solubility and their removal by rain. By suitable formulation of such chemicals with the compositions which are the subject of this invention it is possible to produce stable soluble concentrated solutions. On appropriate dilution of these solutions (which can be carried out during spraying), it is possible to produce an insoluble dispersion of the chemical having an increased persistence on the plant or animal. This behaviour, which is due to the complex interactions between the sugar phosphates, inorganic phosphate and organic cations in solution is another manifestation of the utility of the controllable solubility behaviour which is a characteristic of the compositions of this invention.

We claim:

1. A composition of matter consisting of a complex association of two components (a) and (b), said component (a) consisting of at least one salt of a sugar phosphate, and said component (b) consisting of an inorganic phosphate, wherein the cation is selected from the group consisting of $Ca^{2+}$, $Cu^{2+}$, $Mn^{2+}$, $Zn^{2+}$, $Ni^{2+}$, $Sn^{2+}$, $Fe^{2+}$, $Fe^{3+}$, $Al^{3+}$; said association being such that a least 2% by weight of component (b) based on the weight of component (a) is soluble in water under ambient conditions when the total dissolved sugar phosphate and inorganic phosphate exceeds about 5 parts per 100 parts water by weight.

2. A composition of matter consisting of a complex association of two components (a) and (b), said component (a) consisting of at least one salt of a sucrose phosphate, and said component (b) consisting of an inorganic phosphate wherein the cation is selected from the group consisting of calcium, copper, manganese, zinc, nickel, tin, iron, and aluminum, said association being such that at least 2% by weight of component (b) based on the weight of component (a) is soluble in water under ambient conditions when the total dissolved sucrose phosphate and inorganic phosphate exceeds about 5 parts per 100 parts water by weight.

3. A composition of matter consisting of a complex association of two components (a) and (b), said component (a) consisting of a mixture of calcium sucrose phosphates, and said component (b) consisting of an inorganic calcium phosphate; said association being such that at least 2% by weight of component (b) based on the weight of component (a) is soluble in water under ambient conditions when the total dissolved sucrose phosphate and inorganic phosphate exceeds about 5 parts per 100 parts water by weight.

4. A composition of matter consisting of a complex association of two components (a) and (b), said component (a) consisting of at least one salt of a glucose phosphate, and said component (b) consisting of an inorganic phosphate wherein the cation is selected from the group consisting of calcium, copper, manganese, zinc, nickel, tin, iron and aluminum; said association being such that at least 2% by weight of component (b) based on the weight of component (a) is soluble in water under ambient conditions when the total dissolved glucose phosphate and inorganic phosphate exceeds about 5 parts per 100 parts water by weight.

5. A composition of matter consisting of a complex association of two components (a) and (b), said component (a) consisting of a mixture of calcium glucose phosphates, and said component (b) consisting of an inorganic calcium phosphate; said association being such that at least 2% by weight of component (b) is soluble in water under ambient conditions when the total dissolved glucose phosphate and inorganic phosphate exceeds about 5 parts per 100 parts water by weight.

6. A composition of matter consisting of a complex association of two components (a) and (b) in proportion by weight of about 80:15, said component (a) consisting of a mixture of calcium sucrose phosphates, and said component (b) consisting essentially of tricalcium phosphate; said association being such that about 19% by weight of component (b) based on the weight of component (a) is soluble in water under ambient conditions when the total dissolved sucrose phosphate and inorganic phosphate exceeds about 5 parts per 100 parts water by weight.

7. A composition of matter consisting of a complex association of two components (a) and (b) in proportion by weight of about 90:7, said component (a) consisting of a mixture of calcium glucose phosphates, and said component (b) consisting essentially of tricalcium phosphate; said association being such that about 8% by weight of component (b) based on the weight of component (a) is soluble in water under ambient conditions when the total dissolved glucose phosphate and inorganic phosphate exceeds about 5 parts per 100 parts water by weight.

8. A substance incorporating two components (a) and (b) in proportion by weight of about 35:30, of which component (a) consists of a mixture of calcium sucrose phosphates and component (b) consists essentially of tricalcium phosphate; said substance being such that about 60% is soluble in water under ambient conditions to give a solution incorporating a composition of matter consisting of a complex association of (a) and (b); said association being such that about 8% by weight of component (b) based on the weight in solution of component (a) is soluble in water under ambient conditions when the total dissolved sucrose phosphate and inorganic phosphate exceed about 5 parts per 100 parts water by weight.

9. A method of preparing a composition of matter, which method includes the steps of phosphorylating a sugar with phosphorus oxychloride in the presence of an appropriate base of a first multivalent metal cation selected from the group consisting of calcium, copper, manganese, zinc, nickel, tin, iron and aluminum, and thereafter exchanging the first cation for a second cation selected from the same group of multivalent metal cations; said composition consisting of a complex association of two components (a) and (b), said component (a) consisting of a mixture of sugar phosphate salts, and said component (b) consisting of an inorganic phosphate of said second multivalent cation; said association being such that at least 2% by weight of component (b) based on the weight of component (a) is soluble in water under ambient conditions when the total dissolved sugar phosphate and inorganic phosphate exceeds about 5 parts per 100 parts water by weight.

10. A method according to claim 9 wherein the sugar is sucrose and the first cation is calcium.

11. An aqueous solution incorporating a composition of matter consisting of a complex association of two components (a) and (b), said component (a) consisting of a sugar phosphate salt and said component (b) consisting of an inorganic phosphate wherein the cation is selected from the group consisting of $Ca^{2+}$, $Cu^{2+}$, $Mn^{2+}$, $Zn^{2+}$, $Ni^{2+}$, $Sn^{2+}$, $Fe^{2+}$, $Fe^{3+}$, $Al^{3+}$; said association being such that at least 2% by weight of component (b) based on the weight of component (a) is dissolved in water under ambient conditions when the total dissolved sugar phosphate and inorganic phosphate exceeds about 5 parts per 100 parts water by weight.

12. A composition of matter according to claim 1 wherein the sugar phosphate is a phosphate ester of a sugar selected from the group consisting of sucrose, glucose, maltose, lactose and fructose.

13. A composition of matter consisting of a complex association of two components (a) and (b), said component (a) consisting of a mixture of stannous sucrose phosphates and said component (b) consisting of an inorganic stannous phosphate, said association being such that at least 2% by weight of component (b) based on the weight of component (a) is soluble in water under ambient conditions when the total dissolved sucrose and inorganic phosphate exceeds about 5 parts per 100 parts water by weight.

References Cited

FOREIGN PATENTS 247,809    6/1912    Germany.

LEWIS GOTTS, *Primary Examiner.*

E. L. ROBERTS, *Examiner.*

J. R. BROWN, *Assistant Examiner.*